(12) United States Patent
Loganathan et al.

(10) Patent No.: US 9,117,596 B2
(45) Date of Patent: Aug. 25, 2015

(54) CAPACITOR ELECTRODES FOR LEAD-ACID BATTERY WITH SURFACE-MODIFIED ADDITIVES

(71) Applicant: Johnson Controls Technology Company, Holland, MI (US)

(72) Inventors: Kavi G. Loganathan, Glendale, WI (US); Junwei Jiang, Glendale, WI (US); Perry M. Wyatt, Fox Point, WI (US); Deepan Chakkaravarthi Bose, Milwaukee, WI (US); Scott D. Gerner, Brookfield, WI (US)

(73) Assignee: Johnson Controls Technology Company, Holland, MI (US)

( * ) Notice: Subject to any disclaimer, the term of this patent is extended or adjusted under 35 U.S.C. 154(b) by 174 days.

(21) Appl. No.: 13/851,853

(22) Filed: Mar. 27, 2013

(65) Prior Publication Data

US 2014/0072833 A1    Mar. 13, 2014

Related U.S. Application Data (60) Provisional application No. 61/616,346, filed on Mar. 27, 2012.

(51) Int. Cl.

| | |
|---|---|
| *H01M 4/133* | (2010.01) |
| *H01M 4/14* | (2006.01) |
| *H01G 11/40* | (2013.01) |
| *H01G 11/04* | (2013.01) |
| *H01G 11/32* | (2013.01) |
| *H01G 11/36* | (2013.01) |
| *H01G 11/38* | (2013.01) |
| *H01M 12/00* | (2006.01) |
| *H01M 4/54* | (2006.01) |
| *H01M 10/06* | (2006.01) |

(52) U.S. Cl.
CPC .............. *H01G 11/40* (2013.01); *H01G 11/04* (2013.01); *H01G 11/32* (2013.01); *H01G 11/36* (2013.01); *H01G 11/38* (2013.01); *H01M 4/54* (2013.01); *H01M 10/06* (2013.01); *H01M 12/005* (2013.01); *Y02E 60/126* (2013.01); *Y02E 60/13* (2013.01)

(58) Field of Classification Search
None
See application file for complete search history.

(56) References Cited

U.S. PATENT DOCUMENTS

| | | | |
|---|---|---|---|
| 5,658,689 A | 8/1997 | Kawakami et al. | |
| 7,479,348 B2 | 1/2009 | Issaev et al. | |

(Continued)

FOREIGN PATENT DOCUMENTS

| | | |
|---|---|---|
| EP | 2273602 | 1/2011 |

OTHER PUBLICATIONS

European Patent Office, International Searching Authority, International Search Report and Written Opinion of PCT/US2012/070544, date of mailing Jul. 12, 2013, 17 pages.

(Continued)

*Primary Examiner* — Cynthia K Walls
(74) *Attorney, Agent, or Firm* — Fletcher Yoder, P.C.

(57) ABSTRACT

Electrodes, which may be composite capacitor electrodes, include carbon fibers, illustratively chopped carbon fibers having an aspect ratio of from about 100-5000, have been treated with a non-ionic surfactant, specifically the polyoxyethyleneglycol octophenyl ether, Triton X-100, to increase the hydrophilicity of the fibers. The capacitive electrodes prepared with the surface-modified carbon fibers exhibit increased charge acceptance.

21 Claims, 4 Drawing Sheets

(56) References Cited

U.S. PATENT DOCUMENTS

| | | |
|---|---|---|
| 7,524,581 B2 | 4/2009 | Issaev et al. |
| 7,544,384 B2 | 6/2009 | Issaev et al. |
| 7,544,445 B2 | 6/2009 | Kinouchi et al. |
| 7,560,192 B2 | 7/2009 | Hwang et al. |
| 7,575,830 B2 | 8/2009 | Kawamura et al. |
| 7,615,314 B2 | 11/2009 | Kawakami et al. |
| 7,736,809 B2 | 6/2010 | Hwang et al. |
| 7,745,048 B2 | 6/2010 | Hwang et al. |
| 7,753,968 B2 | 7/2010 | Boczer et al. |
| 7,785,740 B2 | 8/2010 | Amine et al. |
| 7,803,199 B2 | 9/2010 | Kawakami et al. |
| 7,803,290 B2 | 9/2010 | Kosuzu et al. |
| 7,923,151 B2 * | 4/2011 | Lam et al. .................... 429/225 |
| 7,927,743 B2 | 4/2011 | Inoue et al. |
| 7,972,724 B2 | 7/2011 | Kim et al. |
| 7,981,388 B2 | 7/2011 | Ivanov et al. |
| 7,988,895 B2 | 8/2011 | Takita et al. |
| 8,003,254 B2 | 8/2011 | Bofinger et al. |
| 2002/0008956 A1 * | 1/2002 | Niu ............................... 361/502 |
| 2011/0183180 A1 | 7/2011 | Yu et al. |

OTHER PUBLICATIONS

Xu, B., Fell, C.R. Chi, M. and Meng, Y.S., Energy Environ. Sci. 4 (2011) 2223-2233.
T. Achiha et al., Electrochem. Soc. 156 (2009) A483-A488.
Y-K. Han et al., Journal of Power Sources 187 (2009) 581-585.
PCT International Search Report for Application No. PCT/US2013/034183 mailed Jul. 22, 2013.

* cited by examiner

CHRONOPOTENTIOMETRY OF Pb/PbO$_2$
AND Pb/PbO$_2$/C SYSTEMS

CAPACITOR ELECTRODES FOR LEAD-ACID BATTERY WITH SURFACE-MODIFIED ADDITIVES

CROSS-REFERENCE TO RELATED APPLICATION

This application claims the benefit under 35 U.S.C. 119(e) of provisional patent application No. 61/616,346, entitled NEGATIVE ELECTRODES OF INCREASED CHARGE ACCEPTANCE FOR LEAD-ACID BATTERY, filed Mar. 27, 2012, which is hereby incorporated by reference.

BACKGROUND OF THE INVENTION

Unless otherwise indicated herein, the materials described in this section are not prior art to the claims in this application and are not admitted to be prior art by inclusion in this section. The concepts discussed in this section are known to the inventors but are not necessarily known to others or previously conceived or pursued by others.

It is generally known to provide typical lead-acid (Pb-acid) batteries for starting, lighting, and ignition (SLI) applications in a vehicle. Such Pb-acid batteries usually have a capacity of about 70 Ah and a voltage of about 12V. The weight of such Pb-acid batteries is typically about 21 kg and the energy density is often about 40 Wh/kg. One performance requirement for Pb-acid batteries for SLI applications is referred to as the "cold cranking current" requirement. Vehicle engine starting requires delivery of a relatively high current within a few seconds, which is especially difficult in cold weather conditions. However, such known Pb-acid batteries, in order to meet the cold cranking current requirement, are sized such that they tend to occupy a relatively large amount of space, and add weight to the vehicle platform.

Another drawback with conventional battery systems is the issue of poor charge acceptance. That is, in certain instances, the battery may not be capable of handling the high charge current, which may have an undesirable impact on the vehicle's energy regeneration capability. Accordingly, it would be desirable to provide one or more advanced energy source systems that are capable of efficiently meeting the cold cranking current requirements for engine starting while being packaged in a smaller and lighter device. Further, it would also be desirable to provide one or more advanced energy source systems that are adaptable for use with components associated with start-stop technology or components of the vehicle (e.g. to permit stopping of the vehicle engine during standstill periods and restart upon demand by the driver), or with components associated with mild-hybrid technology or components of the vehicle (e.g. to provide motor-driven boost or assist in accelerating a vehicle to a cruising speed), and electrical vehicle applications, and in a voltage range of approximately 10-400V, and more particularly within a range of approximately 10-100V.

One known improvement to advanced energy source systems for electric vehicles has been the development electrochemical capacitors to supplement standard Pb-acid batteries. Capacitors can release power more rapidly than a battery, and hence, are able to deliver bursts of power when needed.

Electrochemical capacitors are distinguishable from traditional electrolytic capacitors which store energy by charge separation across a thin insulating oxide film that is often formed by a controlled electrolytic oxidation process at an appropriate metal plate. Electrochemical capacitors are a special kind of capacitor based on charging and discharging at the interfaces of high specific-area materials such as porous carbon materials, or porous oxides of some metals. The porous electrodes create a large effective "plate area." In the presence of an electrolyte, energy is stored in a diffuse double layer, created naturally at a solid-electrolyte interface, when voltage is applied. The thickness of the double layer is only about 1 nm, thus forming an extremely small effective "plate separation." As a result, electrochemical capacitors have high volumetric capacitance density (10-100 times greater than conventional capacitors). They can store electric charge and corresponding energy at high densities in a highly reversible way. They offer advantageously fast charging or discharging rates as compared to most batteries of comparable volume, but their energy density is usually less, by a factor of 3 to 4, than that of batteries. Nevertheless, these properties are a valuable complement to standard Pb-acid batteries.

There is, thus, a need for improved electrochemical capacitors for use in advanced energy source systems suitable for use in electric vehicles.

SUMMARY

In keeping with one aspect of the invention, a capacitor electrode is provided. The capacitor electrode includes, but is not limited to, a lead-based current collector and capacitor active material disposed on the current collector. The capacitor active material comprises a high surface area carbon capacitive material, a conductive additive, which may be a conductive carbon material having a lower surface area, and surface-modified carbon fibers having a high aspect ratio.

In accordance with another aspect of the invention, a capacitor electrode is provided. The capacitor electrode includes, but is not limited to, a lead alloy current collector, a capacitor active material comprising, by weight, 3-5% carbon black of surface area less than 100 $m^2/g$, 10-20% activated carbon of surface area greater than about 3000 $m^2/g$, 5-15% dispersed carbon fibers having an aspect ratio (length/diameter) of between 100-5000 m the carbon fibers being treated with a non-ionic surfactant to modify the surface, and an aqueous solvent.

Pursuant to another aspect of the invention a lead-acid battery is provided. The lead-acid battery includes, but is not limited to, at least one $PbO_2$ positive electrode, at least one Pb-based negative electrode, and a carbon-containing negative capacitor electrode electronically connected in parallel to the Pb-based negative electrode. The carbon-containing negative capacitor electrode has a lead-based current collector, a capacitor active material disposed on the current collector, the capacitor active material including a high surface area carbon capacitive material, a conductive additive which is a conductive carbon material having a lower surface area than the carbon capacitive material, and surface-modified carbon fibers having an aspect ratio (l/d) of between about 100-5000. The lead-acid battery also includes an electrolyte in communication with the electrodes.

These as well as other aspects, advantages, and alternatives will become apparent to those of ordinary skill in the art by reading the following detailed description, with reference where appropriate to the accompanying drawings. Further, it should be understood that the disclosure provided in this summary section and elsewhere in this document is intended to discuss the embodiments by way of example only and not by way of limitation.

BRIEF DESCRIPTION OF THE DRAWINGS

The foregoing objects, features and advantages of the present invention will be described in detail and further advantageous features will be made apparent from the following detailed description of the energy storage system of present invention which is given with reference to the several figures of the drawing, in which.

DETAILED DESCRIPTION

An advanced energy source system in accordance with on embodiment of the invention is an improved lead-acid battery which includes an electrochemical capacitor electrode, connected in parallel, to the electrode of a standard lead-acid battery. A battery includes multiple cells, each comprising a positive electrode, or plate, which has as a major component lead dioxide ($PbO_2$) and a negative electrode or plate that has as a major component lead (Pb). The electrodes are in communication with a liquid electrolyte, consisting of sulfuric acid ($H_2SO_4$) and water ($H_2O$).

Each plate consists of a framework called a grid, or current collector, which may be made of lead and in for example, to which the electrochemically active material is attached. The electrochemically active material is typically in the form of a paste which is coated on the grid. Electrochemically active material for negative and positive electrodes of a lead-acid battery are well-known in the art and are, typically, lead-based (spongy lead) for the negative electrode and lead oxide-based for the positive electrode. Of course, the electrochemically active materials used in the positive and negative electrodes may contain additives, or other materials, as is known in the art.

The grid, or current collector, may be formed of lead, or a lead alloy, and supports the electrochemically active material. An example of a grid of the type that would be useful in the practice of the invention is disclosed in US Publication No. 2010/0304219 laid open on Feb. 3, 2011, the entire disclosure of which is hereby incorporated by reference.

In the practice of the present invention, an improved carbon-containing capacitor electrode is electronically connected in parallel to the Pb-based electrode of a battery cell. The carbon-containing capacitor electrode of a preferred embodiment of the present invention has a lead-based current collector on which the capacitor active material is disposed.

The capacitor active material is an admixture, or paste, which includes a high surface area carbon capacitive material. In a preferred embodiment of the invention, the high surface area carbon capacitive material is activated carbon. Activated carbon is the most widely used capacitive material for practical reasons, inter alia, such as availability and cost. Known capacitor electrodes may comprise activated carbon having a surface area of between 1000 and 3500 $m^2/g$. In the preferred embodiment of the present invention, the preferred activated carbon has a surface area between about 1000-3500 $m^2/g$.

Further in accordance with the practice of the instant invention, the capacitor active material includes a conductive additive which, in specific preferred embodiments, is a conductive carbon material having a lower surface area than the carbon capacitive material, specifically carbon black having a surface area that is less than about 100 $m^2/g$ in a specific preferred embodiment. Other conductive carbons include carbon black, amorphous carbon, carbon nanoparticles, and carbon nanotubes. Of course, mixtures of materials may be used in the practice of the invention to obtain an appropriate balance between surface area (and hence capacitance) and conductivity.

A particularly advantageous feature of the present invention, however, is the inclusion of surface-modified carbon fibers in the capacitor active material. In a specific preferred embodiment of the invention, the carbon fibers are chopped carbon fibers having an aspect ratio of between about 100-5000. The carbon fibers have a diameter of between about 10-15 μm.

The carbon fibers are prepared for use in the capacitor active material of the present invention by a process of exposing the fibers to a non-ionic surfactant, which in a specific preferred embodiment, is a polyoxyethyleneglycol octophenyl ether, such as Triton X-100. Triton X-100, or polyethylene glycol p-(1,1,3,3-tetramethyl butyl)-phenyl ether, is available for purchase, for example, from Fisher Scientific or Sigma Aldrich. Triton X-100 has a hydrophilic polyethylene chain (average 9.5 ethylene oxide units) and an aromatic hydrocarbon lipophilic, or hydrophobic group, specifically 4-(1,1,3,3-tetramethylbutyl)-phenyl group. Exposure of the carbon fibers to the Triton X-100 modifies the surface to increase the hydrophilicity of the fibers. The surface-modified carbon fibers form a conductive network in the capacitor active material and add structural integrity to the active material paste. In addition, the surface-modified fibers improve adhesion between the current collector and the paste.

In an improved lead-acid battery embodiment of the present invention, the positive and negative plates, are assembled so that each positive plate is between two negative plates. In a typical lead-acid battery, porous separators would be interposed between the plates to keep the positive and negative plates from touching each other and shorting out the cell. Separators, which are well-known in the art, are typically porous materials, such as porous polymers or adsorptive glass microfibers, which permit the electrolyte to circulate freely around the plates. The positive plates are electrically connected to each other, and all of the negative plates are electrically connected to each other. Multiple cells (made up of a negative and a positive plate) are housed in a suitable battery case. The number of cells is chosen depending on the desired voltage of the battery. For a hybrid electric vehicle, a 36-volt battery might be appropriate, and would consist of 18 cells.

In a negative capacitor electrode embodiment of the invention, a lead-based current collector has capacitor active material of the type described in detail hereinabove, typically in the form of a paste that is coated, or otherwise disposed on the current collector.

In a specific illustrative embodiment, the capacitor active material, or paste, comprises, by weight, 3-5% carbon black of surface area less than 100 $m^2/g$; 10-20% activated carbon of surface area less than 2000 $m^2/g$; and 5-15% dispersed surface-modified carbon fibers, the total solid content being less than 40%. The remainder of the content being solvent, which is typically, and as a practical matter, water.

In some embodiments, the electrode capacitor active material may optionally include a binder and/or an expander. Exemplary expanders include finely-divided carbon, polymers, or barium sulfate. Binders are typically polymers, and include carboxymethylcellulose (CMC), neoprene, polyvinyl fluoride, styrene-butadiene rubber or polytetrafluoroethylene (PTFE).

When the capacitor active material is disposed on a current collector, such as a lead alloy current collector of the type described hereinabove, or on a metal foil, as in the experimental methods presented below, a capacitor electrode is formed.

Of course, the capacitor electrodes of the present invention can be used to fabricate any energy storage device that uses a negative capacitive electrode alone, or in conjunction with, standard lead-containing negative, or positive electrodes. The capacitor electrodes of the present invention can further be used to fabricate an energy storage device that uses a positive capacitive electrode alone.

Figure 1:
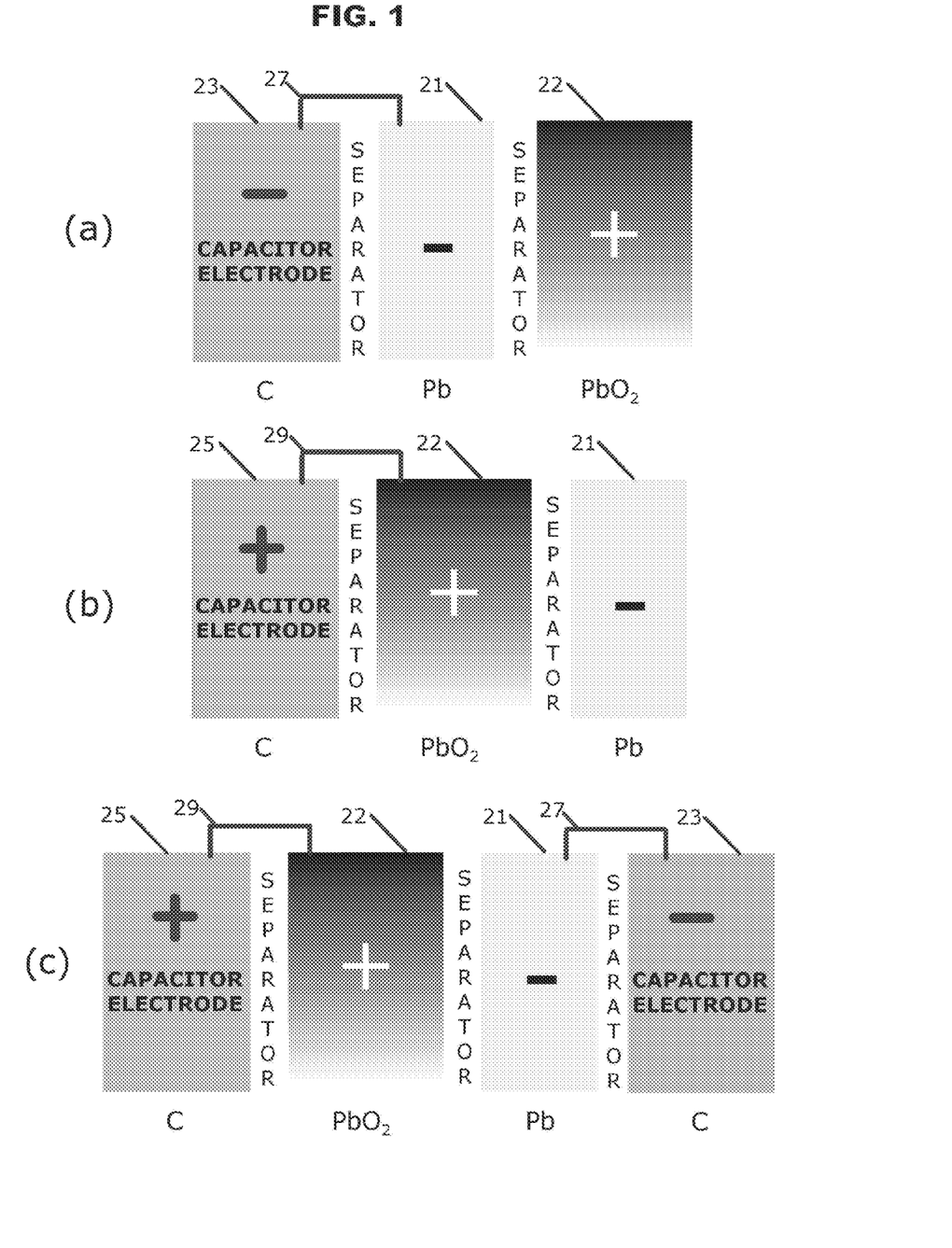
FIGS. 1(a), 1(b), and 1(c) are simplified schematic representations of a single cell of a battery embodiment incorporating a capacitor electrode that can be either a positive or negative electrode in accordance with the present invention.

The energy storage system may be an improved lead-acid battery in accordance with the present invention which includes an electrochemical capacitor electrode, connected in parallel, to the negative or positive electrode of a standard lead-acid battery, as shown in FIG. 1.

FIGS. 1(a), 1(b), and 1(c) are simplified schematic representations of the electrodes of a single cell of a battery embodiment of the present invention arranged in respective interconnections with a capacitor. It is to be understood that the principles herein described can be applied to the fabrication of the multiple cells that are included in some known batteries. As shown in FIG. 1(a), a battery (not shown) has a negative electrode 21 and a positive electrode 22. In the three-electrode arrangement of FIG. 1(a), lead-based negative battery electrode 21 (Pb) and lead-based positive battery electrode 22 ($PbO_2$) are conventional electrodes of the type well-known in the art. A negative capacitor electrode 23 is, in this embodiment of the invention, connected in parallel with negative battery electrode 21 illustratively by a connector 27. Battery electrodes 21 and 22 are immersed in an electrolyte (not shown) that typically is employed in lead-acid batteries. The electrolyte used in one embodiment of the invention is $H_2SO_4$ having a specific gravity of 1.280.

FIG. 1(b) is a simplified schematic representation that depicts a positive capacitor electrode 25 connected in parallel with positive battery electrode 22, illustratively by a connector 29. Elements of structure that have previously been discussed are similarly designated. FIG. 1(c) depicts an embodiment of the invention wherein positive electrode 25 of the capacitor is connected in parallel with positive electrode 22 of the battery via connector 29, as previously noted, and negative capacitor electrode 23 is connected in parallel with negative battery electrode 21 via connector 27.

Carbon-based capacitor electrode 23 is made in accordance with the present invention, and illustratively, comprises the formulation of Example 2 and was made by the techniques set forth in Examples 1a and 1b.

It is to be understood that the arrangement of FIG. 1 is for the purposes of illustration only. For example, negative electrode 21 and positive electrode 22, are shown in FIG. 1 as separate and distinct elements, however, without departing from the spirit and scope of the invention, they can be a unitary hybrid negative electrode where the carbon paste-based negative capacitor electrode is confined to one region and the conventional lead-based negative electrode is confined to another region.

The following are specific illustrative embodiments directed to methods of making capacitor active material, or paste, as well as electrodes, in accordance with the invention.

Example 1

The following is an illustrative method of making a specific capacitor active material, or paste, in accordance with the invention.

In the present invention, the capacitor active material includes carbon fibers that have been treated with a non-ionic surfactant to increase their hydrophilicity, specifically Triton X-100. As used herein, the term "surface-modified carbon fibers" refers to short carbon fibers that have been treated with a non-ionic surfactant to modify the surface. While not wishing to be bound by theory, it is believed that the polyether chemical moieties in Triton X-100 surfactant electrostatically adsorb to the surface of the carbon fibers.

Surfactants are compounds that lower the surface tension of a liquid, the interfacial tension between two liquids, or that between a liquid and a solid, and hence, are used as well-known detergents, wetting agents, emulsifiers, foaming agents, and dispersants.

It is known to treat carbon nanotubes and nanofibers, with aromatic compounds, surfactants, or polymers. Specifically, it is known that Triton-X will adsorb to the surface of a carbon nanotube by hydrophobic interaction. Moreover, since nanotubes do not disperse well, surfactants have been used to aid in dispersion and, in some known instances, to aid in covalent linkage of other functional groups. However, surface-modified short carbon fibers, of the type used in the practice of the present invention, have not previously been used as an additive in capacitor electrode active materials.

First, carbon fibers are prepared for incorporation into the capacitor active material by the surface-modification technique described in Example 1a. In this specific embodiment, short chopped carbon fibers, having an aspect ratio of between 100 and 5000, and a diameter in the range of about 10 µm to 15 µm, and sold under the trademark TENAX, were purchased from Toho Tenax, Auburn Hills, Mich.

Example 1a

The carbon fibers were sonicated in a aqueous solution of Triton X-100 (2% by weight) for about an hour, then filtered, and dried at 100 C for 24 hours. The chopped carbon fibers have increased hydrophilicity after being processed in this manner.

Figure 2:
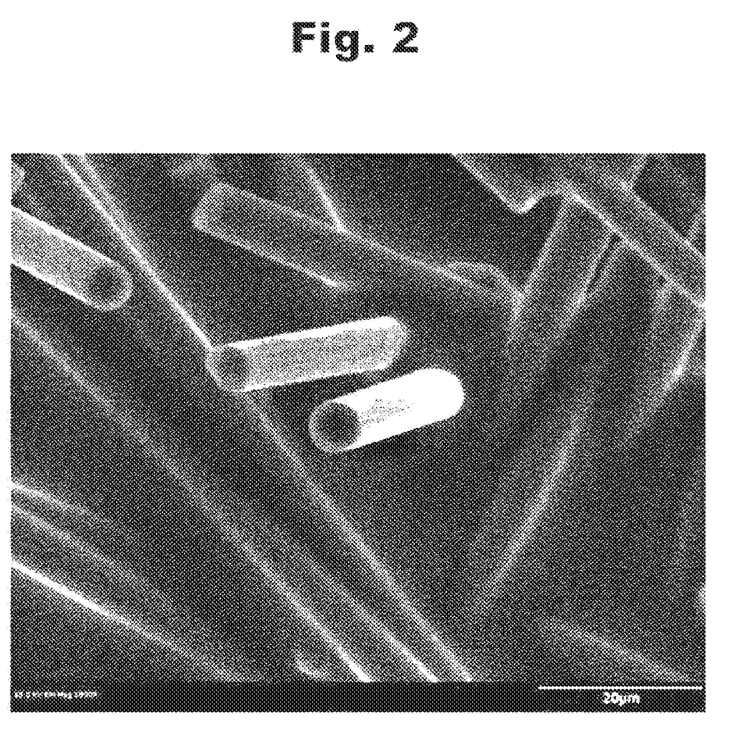
FIG. 2 is a scanning electron micrograph that shows of carbon fibers dispersed in Triton X-100 surfactant.

FIG. 2 is a scanning electron micrograph of dispersed carbon fibers in the Triton X-100 surfactant.

Example 1b

Referring, for example, to the formulation of Example 2, a slurry is prepared by combining all of the carbons (i.e., activated carbon, carbon black, surface-modified fibers (see Example 1a), and Graphite G8 C-preme) in an aqueous solution (2 wt %) of a binder, which in this specific example is carboxymethylcellulose (CMC). Graphite G8 C-preme is available from Phillips 66, Houston, Tex. The other carbons, as previously noted, can be purchased from Sigma Aldrich or Fisher Scientific. The active carbon content of the specific formulation of Example 3 will be 30% by weight. The remainder will be water.

In some embodiments, additional binder, such as polytetrafluoroethylene (PTFE), can be added to the carbon slurry to further improve adhesion of the paste to a current collector grid. In this case, PTFE can be added in an amount of up to 10% by volume. A binder volume of about 10% by volume is optimized for the formulation to hit the percolation threshold.

Example 2

The following is a specific illustrative formulation of capacitor electrode active material, or paste, in accordance with the invention.

| Component | Weight (g) |
| --- | --- |
| Activated carbon | 9.4 g |
| Carbon black | 3.0 g |
| Carbon fibers | 10.0 g |
| Graphite G8 C-preme | 5.0 g |
| 2 wt % CMC in water | 50 g |

Example 3

A lead alloy-based current collector or grid (proprietary to Johnson Controls Inc., Milwaukee, Wis.) is coated with the admixture of Example 2 prepared in accordance with the methods of Example 1. After coating, the electrode is air-dried for 6-8 hours. Then, the air-dried electrode is baked for 3 hours at 200° C. Next, the electrode is hot-pressed with 6 metric tons at 200° C. for 3-5 minutes.

Example 4

Surface-modified carbon fibers as made in Example 1a can be used as an additive in the fabrication of a spongy lead negative electrode in accordance with known techniques for making a spongy lead negative electrode with carbon fiber additive. In a preferred embodiment of the invention, the surface-modified carbon fibers can be present in the spongy lead-based electrode in about 0.1-15% by weight.

Experimental Results

The advantages of adding the surface-modified carbon fibers in accordance with the instant invention include, an increase the percolation threshold; an increase in electrochemical contact between the components; an increase in hydrophilicity of the electrode due to an increases in local electrolyte reservoirs; improved dispersion of the carbon fibers in the electrode active material; and greater charge acceptance due to increased current from the $PbSO_4$ to Pb reaction over several cycles.

These advantages are supported by data obtained with the test cell as shown schematically in FIG. 1.

Chronopotentiometry

A negative capacitor electrode, made in accordance with Example 3, and a spongy Pb electrode were connected in parallel with each other as shown in FIG. 1. The system was tested using a $PbO_2$-based positive electrode as the reference and counter electrode. The two negative electrodes were the working electrodes. The electrodes, having a total electrode area of 3.5 $cm^2$, were immersed in 1.280 specific gravity $H_2SO_4$ as the electrolyte.

Figure 3A:
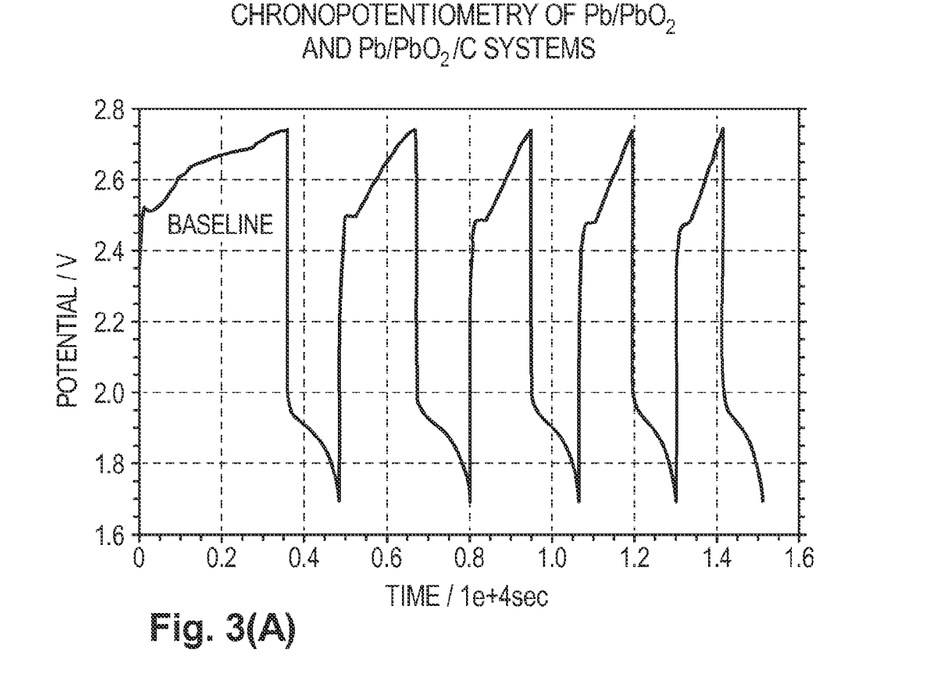
FIG. 3 is a graphic representation of the potential of the three-electrode test cell configuration of FIG. 2 as a function of time at a fixed current (FIG. 3B and, as the baseline, a standard test cell comprising a lead oxide positive electrode and a lead negative electrode of the type known in the art (FIG. 3(A))
Figure 3B:
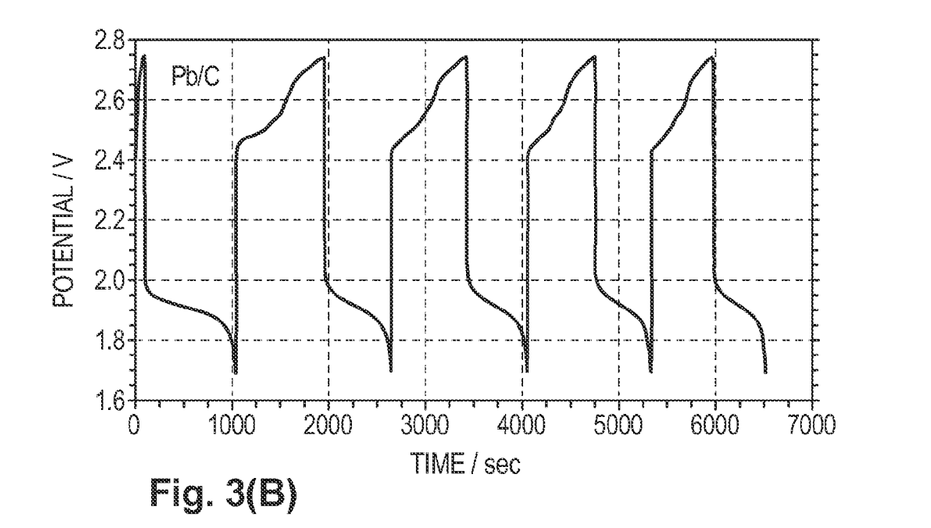

Chronopotentiometry measures the rate of change of potential at an electrode against a constant current. In this experiment, the total current applied was 55 $mA/cm^2$. FIG. 3(A) is a graphic representation of the potential of a standard test cell (lead oxide as the positive electrode and lead as the negative electrode) as a function of time to generate a baseline. FIG. 3(B) is a graphic representation of the potential of the three-electrode test cell configuration of FIG. 1 as a function of time. FIG. 3(B) shows that the rate of charge and discharge for the three electrode configuration is increased relative to the standard test cell shown in FIG. 3(A). The increased capacitance effect of the carbon additives in the negative capacitor electrode of the present invention increases the rate of conversion of $PbSO_4$ to Pb.

Cyclic Voltammetry

To demonstrate the effect of the carbon additives, including the surface-modified carbon fibers, cyclic voltammetric studies were conducted. The results show an increase in the anodic current.

Figure 4:
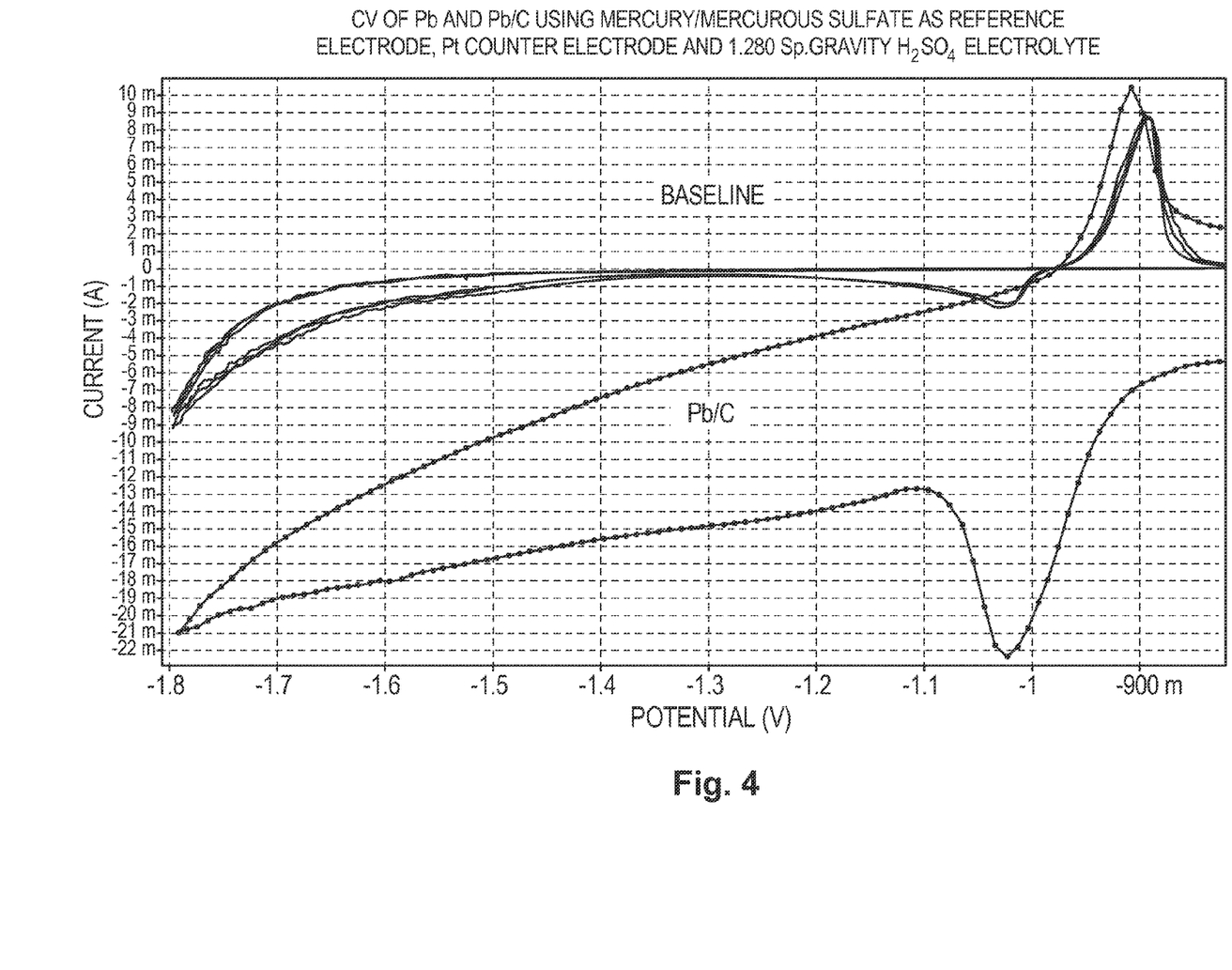
FIG. 4 is a graphic representation of a cyclic voltammogram trace of the current of the working electrode, which is a carbon-based capacitor electrode in accordance with the present invention plotted against applied voltage window at fixed scan rate.

FIG. 4 shows a cyclic voltammogram trace which is a graphic representation of the working electrode potential which is ramped linearly versus time until it reaches a set potential, and then is inverted. The current of the working electrode is plotted against the applied voltage. A carbon-based negative capacitor electrode, as in Example 3, was prepared by coating capacitor active material on lead-based substrate as the current collector. Mercury/mercurous sulfate was used as the reference electrode. A platinum (Pt) rod was used as the counter electrode. The electrode samples were scanned at 2-5 mV/sec from −6 to −1.8 mV. The cyclic voltammogram trace in FIG. 4 demonstrates that the charge efficiency is increased by addition of the surface-modified carbon fibers in accordance with the present invention by an increase in anodic current.

Although the invention has been described in terms of specific embodiments and applications, persons skilled in the art may, in light of this teaching, generate additional embodiments without exceeding the scope or departing from the spirit of the invention described and claimed herein. Accordingly, it is to be understood that the drawing and description in this disclosure are proffered to facilitate comprehension of the invention, and should not be construed to limit the scope thereof.

While certain features and embodiments of the invention have been illustrated and described, many modifications and changes may occur to those skilled in the art without materially departing from the novel teaching and advantages of the subject matter recited in the appended claims. It therefore should be understood that the appended claims are intended to cover all such modification and changes as fall within the true spirit of the invention.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The technical effects and technical problems in the specification are exemplary and are not limiting. It should be noted that the embodiments described in the specification may have other technical effects and can solve other technical problems.

The invention claimed is:

1. A lead-acid battery, comprising:
 a capacitor electrode, comprising:
  a lead-based current collector; and capacitor active material disposed on the current collector, wherein the capacitor active material comprises:
a carbon capacitive material,
a conductive carbon material having a lower surface area than the carbon capacitive material, and
carbon fibers treated with polyethylene glycol-based surfactant which is adsorbed onto the carbon fibers to produce surface modified carbon fibers.

2. The lead-acid battery of claim 1, wherein the carbon capacitive material is activated carbon.

3. The lead-acid battery of claim 1, wherein the conductive carbon material is carbon black.

4. The lead-acid battery of claim 1, wherein the surface modified carbon fibers have an aspect ratio of between approximately 100 and approximately 5000.

5. The lead-acid battery of claim 4, wherein the polyethylene glycol-based surfactant is a polyoxyethyleneglycol octophenyl ether.

6. The lead-acid battery of claim 1, wherein the capacitor electrode comprises a polymer binder.

7. The lead-acid battery of claim 6, wherein the polymer binder is selected from the group consisting of carboxymethylcellulose, polytetrafluoroethylene, and styrene-butadiene rubber.

8. The lead-acid battery of claim 7, wherein the polymer is polytetrafluoroethylene.

9. The lead-acid battery of claim 1, wherein the capacitor active material is negative.

10. A lead-acid battery, comprising:
at least one $PbO_2$ positive electrode;
at least one Pb-based negative electrode;
a capacitor electrode electronically connected in parallel to the at least one Pb-based negative electrode, wherein the capacitor electrode comprises:
a lead-based current collector,
a capacitor active material disposed on the current collector, wherein the capacitor active material comprises:
a carbon capacitive material,
a conductive carbon material having a lower surface area than the carbon capacitive material, and
carbon fibers treated with a polyethylene glycol-based surfactant which is adsorbed onto the carbon fibers to produce surface modified carbon fibers; and
an electrolyte in communication with the at least one positive electrode and the at least one negative electrode.

11. The lead-acid battery of claim 10, wherein the surface modified carbon fibers have an aspect ratio of between approximately 100 and approximately 5000.

12. The lead-acid battery of claim 10, wherein the polyethylene glycol-based surfactant is a polyoxyethyleneglycol octophenyl ether.

13. The lead-acid battery of claim 10, wherein the carbon capacitive material has a surface area greater than about 2000 $m^2/g$.

14. The lead-acid battery of claim 10, wherein the carbon capacitive material has a surface area greater than about 3000 $m^2/g$.

15. The lead-acid battery of claim 10, wherein the carbon capacitive material comprises between 10 wt % and 20 wt % of the capacitor active material.

16. The lead-acid battery of claim 10, wherein the conductive carbon material has a surface area of approximately 100 $m^2/g$ or less.

17. The lead-acid battery of claim 10, wherein the conductive carbon material comprises between 3 wt % and 5 wt % of the capacitor active material.

18. The lead-acid battery of claim 10, wherein the surface modified carbon fibers comprise between 5 wt % and 15 wt % of the capacitor active material.

19. The lead-acid battery of claim 10, wherein the capacitor electrode comprises an aqueous solvent.

20. The lead-acid battery of claim 1, comprising at least one Pb-based negative electrode, wherein the at least one Pb-based negative electrode is electrically connected in parallel to the capacitor electrode.

21. The lead-acid battery of claim 20, comprising:
at least one $PbO_2$ positive electrode, and
an electrolyte in communication with the at least one positive electrode and the at least one negative electrode.

* * * * *